United States Patent Office 3,092,617
Patented June 4, 1963

3,092,617
WEAKLY BASIC ANION EXCHANGE RESINS
Charles A. Feldt, Naperville, and George T. Kekish, Chicago, Ill., assignors to Nalco Chemical Company, Chicago, Ill., a corporation of Delaware
No Drawing. Filed May 20, 1960, Ser. No. 30,436
31 Claims. (Cl. 260—2.1)

The present invention relates to new and improved weakly basic anion exchange resins. Particularly, the invention relates to anion exchange resins which have improved ion absorption, and ion exchange properties. The invention is also directed to a method of preparing these new weakly basic anion exchange resins as well as to the use of such resins in the removal of electrolytes from various types of liquids.

Ion exchange materials are well known in the art. Such materials have the ability to exchange ions between a solid and liquid without substantially altering the physical structure of the solid. Ion exchange resins have been used extensively for removing electrolytes from water in such operations as desalting, demineralization, and deionization. Ion exchange processes are also used in the pharmaceutical, food processing, electroplating, petroleum and waste treatment industries, as well as in the field of medicine for removal of undesired components of liquid and for other purposes.

Anion exchange resins, in order to be satisfactory commercially, must be substantially insoluble in water. They must be resistant to physical deterioration such as swelling or shattering. They should have a high porosity and a high operating capacity. It has been noted that resins which are highly porous and have a high capacity also tend to be soft and susceptible to swelling when changing from the regenerated to the exhausted form. The percent swelling depends on a variety of factors such as crosslinking, operating capacity, and the method of preparing the resin. Softness is coupled with a tendency to crumbling. High swelling leads to various engineering problems with respect to the design of the equipment used to provide contact of fluids with the resin in commercial systems. A hard, highly crosslinked resin, which is resistant to swelling and crumbling, correspondingly tends to lack porosity and consequently has a relatively low operating capacity.

Weakly basic anion exchange resins are only highly ionized when in a salt form, and, therefore, have ion exchange activity below pH 7. Because of their low degree of ionization in the free base form, the weakly basic resins show little or no salt splitting capacity. The expression "salt-splitting" refers to the ability of an anion exchange resin to convert ionized salts to their corresponding acids or bases by passage through an anion exchange resin in its free base or hydroxyl form. Due to their low degree of ionization in the free base form, conventional prior art weak base anion exchange resins have a relatively slow pickup for most acids. Also, due to the low degree of ionization of conventional weak base resins, it is virtually impossible to pick up weakly ionized acids such as carbonic acid or silicic acid. Therefore, to the present, most weak base resns have been limited in their use to those situations where it is desired to remove mineral acidity from aqueous solutions and for the separation of weak and strong acids.

Most commonly used weak base anion exchange resins are those prepared by forming a resin backbone by reacting a mono vinyl-aryl compound with a poly vinyl-aryl compound. Typical copolymers of this type are copolymers of styrene and divinyl benzene. These starting copolymers are then alkylated with an alkylating agent such as chloromethyl ether and then reacted with either a primary, or secondary amine or polyamine to introduce the weakly basic exchange sites into the molecule. To produce the finished resin, it is necessary to prepare the backbone of the resin by conducting a suspension polymerization and then through a subsequent series of steps, alkylate the resin and then react it with an amine or amines of the type described. Such a procedure is obviously time consuming and expensive.

Another disadvantage of the weakly basic anion exchange resins now presently known to the art is that they are subject to degradation under oxidizing conditions. This means that under such conditions which are exemplified in the presence of free chlorine or the organic and inorganic peroxides, the resins tend to lose their operating capacity.

The weakly basic anion exchange resins of the instant invention now make available many advantages and characteristics which have not heretofore been available. In the first instance, they have a substantially higher capacity than those resins which have heretofore been commercially acceptable in the field of anion exchange. Further, they are, in some instances, capable of evidencing salt splitting capacity thereby being capable of being operated at higher flow rates without a diminution in their ionic removal or absorption characteristics. The weakly basic anion exchange resins of the invention may be prepared by using simplified synthetic procedures and frequently may be prepared from materials that are commercially available. These resins, as will be demonstrated hereinafter, are also capable of being prepared from dilute aqueous solutions which offers a simplified technique for their preparation. An important advantage of the invention resides in the fact that the resins may be prepared so that their operating characteristics readily may be altered by using only minor variations in the synthetic procedure.

It therefore becomes the object of the invention to provide new and improved weakly basic anion exchange resins.

Another object of the invention is to provide weakly basic anion exchange resins which have extremely high operating capacities and in some instances, evidence salt splitting capacity as well as the capability of removing weak acids such as carbonic and silicic acids.

A further object of the invention is to provide weakly basic anion exchange resins which may be prepared from commercially available materials.

Yet another object is to provide improved anion exchange resins which are capable of being prepared from dilute aqueous solutions with simple manufacturing techniques being needed to produce high quality resins.

Still a further object is to provide improved weakly basic anion exchange resins which may be simply modified to give any number of desired physical and chemical characteristics. Other objects will appear hereinafter.

In accordance with the invention it has been found that weakly basic anion exchange resins may be prepared by condensing a water soluble copolymer of ammonia and a glycerol halohydrin with a water soluble, substantially heterocyclic free polyamine. Expressed in another form, the anion exchange resins of the invention are prepared by the reacting of two water soluble cationic polyelectrolytes.

The ammonia-glycerol halohydrin water soluble polyelectrolyte used in preparing the resins is prepared by reacting a glycerol halohydrin with an aqueous solution of ammonia. While any glycerol halohydrin such as glycerol bromohydrin, monoglycerol chlorohydrin, epichlorohydrin, epibromohydrin and the like, may be used, a convenient and preferred material is found in epichlorohydrin which gives excellent results as well as having the added advantage of being commercially available at a relatively low price.

As indicated, the glycerol halohydrin is reacted with ammonia in the form of a dilute aqueous ammoniacal solution. Good results have been obtained using conventional aqua ammonia, e.g., 28% ammonia in water, although it will be understood that more dilute or more concentrated solutions may be employed. It is critical that the molar ratio of the ammonia to glycerol halohydrin be maintained within the range of about 1 mol to 4 mols of ammonia per mol of glycerol halohydrin. It has been further discovered that if the ammonia is reacted in its non-gaseous state with the glycerol halohydrin, that a non-water soluble polymer is produced which is unsatisfactory in the practices of this invention. To illustrate the preparation of a typical water soluble polymer of ammonia and a glycerol halohydrin, the following is given by way of example:

EXAMPLE I 182 grams (3 mols) of a 28% aqueous ammonia solution were placed in a 500 ml. flask after which 92.5 grams (1 mol) of epichlorohydrin were added with stirring over a period of one hour. An exothermic reaction took place during which the temperature rose to about 90° C. With appropriate cooling, the temperature was not allowed to exceed this 90° C. At the end of the reaction period, a clear, transparent polymeric liquid was produced which was completely soluble in all proportions with water.

The ammonia glycerol halohydrin polymers described above are used in the practices of this invention in the form of their aqueous solutions. The concentration of the polymer in the solution may be varied over a wide range although it is preferred to use relatively concentrated solutions of the polymers. Generally, the concentration of the polymer may range between 45–70 percent by weight although dilutions as low as 3% to about 40% may be used.

The water soluble substantially heterocyclic free polyamines used to react ammonia glycerol halohydrin polymers described above may be selected from a large number of commercially available poly-N-basic materials. To produce anion exchange resins of improved capacity, it was discovered that the polyamines should have preponderant amounts of secondary and tertiary amino groups and conversely they should be substantially free of primary amino groups.

The preferred group of polyamines are high molecular weight amine polymers which contain at least three and preferably more basic nitrogen groups which are not part of a heterocyclic grouping. While amines of this type are preferred, it will be understood that substituted alkylene polyamines and substituted polyalkylene polyamines such as the substituted ethylene diamines and substituted polyalkylene polyamines such as substituted diethylene triamines and tetraethylene pentamines may also be used, with good anion exchange resins being produced in each instance.

As a guide to some typical polyamines contemplated, the following are given by way of illustration.

Perhaps one of the most useful groups of polyamines are the polyethylene imines which are prepared by the homopolymerization or by the copolymerization of ethylene imines having the following structural formula:

(A)

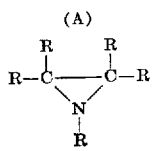

In the above formula R is a member of the class consisting of hydrogen and lower aliphatic hydrocarbon groups of not more than 3 carbon atoms in chain length. Typical starting ethylene imines used in preparing water soluble polyethylene imines are ethylene imine, N-methyl ethylene imine, N-ethyl ethylene imine, 1,2-propylene imine, 1,2-butylene imine, 2,2-dimethyl ethylene imine, 2,3-butylene imine, 2,2,dimethyl 3-N-propyl ethylene imine.

While any polyethylene imine prepared from these typical monomers may be used, it has been found that the best results are obtained when the starting monomers, N-ethyl or N-methyl, ethylene imine are polymerized to produce a water soluble poly-N-ethyl or poly-N-methyl polyethylene imine. Polymers of this type may be obtained commercially having molecular weights in excess of 5,000 with typical grades of the polymer having molecular weights in excess of 25,000 or more.

In addition to using polyethylene imines as described above, it is also possible to use other water soluble heterocyclic free polyamines of the types illustrated below:

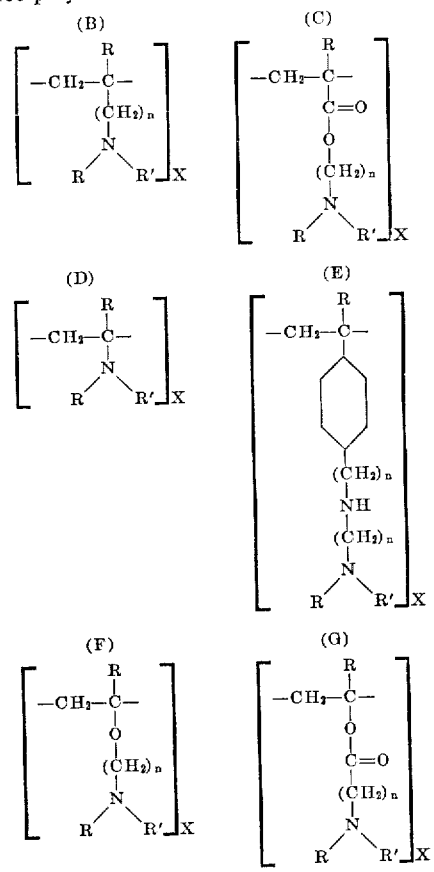

In structural formulas B–F above $n$ is a small whole number having a value of between about 1 and 4. X is an integer and R and R' are members of the class consisting of hydrogen and lower acyclic aliphatic hydrocarbon radicals of from 1 to 4 carbon atoms in chain length. Since secondary and tertiary polyamines are the most useful materials, at least one occurrence of R and R' will be a lower aliphatic hydrocarbon group of the type described.

All of the polymers shown in structural formulas B–F have the basic nitrogen atom as a member of a branch chain group attached to a linear aliphatic hydrocarbon chain. An inspection of these formulas also reveals that the basic N atom is either (1) directly attached to the hydrocarbon polymer chain (D), (2) connected to the hydrocarbon polymer chain through one or more carbon atoms (B), (3) connected to the hydrocarbon polymer chain through an aromatic grouping (E), (4) connected to the hydrocarbon polymer chain through oxygen atom (F), or (5) connected to the hydrocarbon polymer chain through a carboxylic ester group (C and G).

All of the polymers described above are prepared by using addition polymerization techniques in some stage of their preparation. Polymers of type B may be synthesized by hydrogenating a suitable ethylenically unsaturated nitrile e.g. poly-acrylonitrile, and then reacting the hydrogenated polymer with lower hydrocarbon alkylating agents such as ethyl chloride or dimethyl sulfate.

Type C polymers are prepared by esterifying the copolymer of maleic anhydride and another reactive vinyl monomer, e.g. acrylonitrile, styrene, and the like with for instance the hydroxylamine N,N-diethyl ethanol amine.

Polymers of type D are the well known polyvinyl amines illustrated by polyvinyl N,N-dimethyl amine. Polymers of the D and B type are not easily prepared nor are they commercially available. Hence they are not too desirable from a practical standpoint for use as starting reactants.

Polymer type E is readily prepared by alkylating linear polystyrene with chloromethyl ether and then aminating with a polyamine such as N,N-dimethyl ethylene diamine.

Polymers F and G are derivatives of polyvinyl alcohol and are prepared by making amino ethers or amino esters of this polyol. Polymer G may be illustrated by the readily available polymer, poly N,N-dimethyl amino methyl methacrylate. As will be shown later, polymers of this type are admirably suited for making the resins of the invention.

In addition to using high molecular weight polymers of the type described, it is also possible to use lower molecular weight diamines and polyamines. Typical materials of this type are N,N,N',N', tetramethyl ethylene diamine and N,N,N',N', tetramethyl guanidine.

The polyamines as described may be chemically divided into three sub generic groups of poly N-basic materials. The first class is polymeric amines, the second is alkylene polyamines and the third is substituted guanidines. Broadly they may be classified as polyelectrolytes as well as polyamines. They all have the common property of being water soluble and contain at least two basic amino groups. Of the three sub generic groups, the polymeric amines are the most preferred.

The substantially heterocyclic free polyamines used in reacting with the water soluble ammonia-glycerol halohydrin water soluble polymer should be in the form of aqueous solutions or suspensions. As a general rule most of the polyamines described above, particularly the high molecular weight polymeric amines form relatively viscous solutions even at dilute concentrations. As will be seen later, it is necessary that an intimate contact be made between the two reactants, e.g. the ammonia-glycerol halohydrin and the polyamine. It therefore becomes expedient to prepare aqueous solutions of the polyamines so that they are capable of ready dissolution and admixing with the ammonia-glycerol halohydrin resins. To this end it is most desirable to use relatively dilute solutions, e.g., 1 to 10% and preferably 8 to 10% by weight of the polyamine although more concentrated solutions may be employed where the particular polyamine used has suitable viscosity characteristics. In preparing the resins the two polymers are mixed and dissolved or dispersed under conditions of good agitation.

The ammonia-glycerol halohydrin polymers when prepared as described in Example I are reactive and are believed to contain reactive groups e.g., halogen and epoxy groups. These reactive groups are believed to react with the added polyamine to produce a crosslinked water insoluble gelled structure. This reaction proceeds slowly at room temperature. It is preferred to heat the reactants to a temperature between 50° C. and 100° C. for from about ½ to 2 hours.

To produce satisfactory resins from the standpoint of improved physical and chemical characteristics, particularly that of high capacity, it has been found that the weight ratio of ammonia-glycerol halohydrin resin to polyamine based on their dry weight should be within the range of from about 1:99 to about 30:70.

The reaction as described above proceeds simply and the finished product is in the form of a water insoluble gel. This material may be withdrawn from the equipment in which it is prepared and then subjected to further heating to dry the material to a moisture content commensurate with the values that will be hereinatfer shown. A this point the material is a hard, brittle resin which may be ground, crushed, or subjected to other typical mechanical operations to produce a fine, granular product.

While the above describes the composition and the method for preparing satisfactory high capacity weak base anion exchange resins, it has been further found that greatly improved weak base anion exchange resins may be prepared by reacting the reaction product of the ammonia-glycerol halohydrin and the substantially heterocyclic free polyamine with additional amounts of a glycerol halohydrin. This reacting of the two polymers with an additional amount of a glycerol halohydrin tends not only to substantially improve the operating capacity of the resins, but also further tends to make them more resistant to oxidation as well as improving the capacity of the finished resins so that it is capable of removing high amounts of mineral acidity from various types of liquids, and also allows the resins in some instances to remove weak acids such as silicic and carbonic. In a further preferred practice of the invention it has been found that the ammonia-glycerol halohydrin-polyamine condensates may be prepared in the for mof spherical beads or granules.

It it is desired to provide the resin in bead form, the blended liquid may be suspension polymerized by placing in a dispersion medium preferably consisting essentially of toluene containing a detergent type dispersing agent at a temperature of from 20° C. to 120° C. Vigorous agitation should be maintained for a period of from 15 minutes to 5 hours. The resultant beads may be separated from the dispersion by filtering, subsequent to which they may be air dried.

It has further been discovered that the formation of a bead having highly desirable physical properties is enhanced by the addition to the dispersion medium of epichlorohydrin in a weight ratio of from 1:99 to 20:80 parts by weight of epichlorohydrin to the blended resinous mixture, a preferred ratio being 8:92. The addition should be accompanied by agitation at low temperatures, preferably around room temperature. Subsequent to the addition of epichlorohydrin, agitation is continued and the system is heated for a period of from 3 to 5 hours to a temperature of from 100 to 120° C. At the end of this time, the system is cooled, and the beads are filtered from the dispersion media and air dried. In conducting the above detailed copolymerization of ammonia and epichlorohydrin it is essential that the mol ratio of ammonia to epichlorohydrin be maintained between about 1:1–4:1. It is also essential that the ammonia be dissolved in water rather than being in its gaseous state.

To illustrate the preparation of the preferred resins of the invention, the following are given by way of example.

EXAMPLE II

This particular example illustrates the preparation of beads of an ammonia epichlorohydrin polyethylene imine terpolymer which is then subsequently reacted with additional amounts of epichlorohydrin. 103 parts (1.7 moles) of a 28% aqueous ammonia solution were placed in a 500 ml. 3 necked flask equipped with a mechanical stirrer, thermometer and dropping funnel. 92.5 parts of epichlorohydrin (1 mole) were added dropwise to the agitated aqueous ammonia solution. The addition was carried on over a 1½ hour period with the rate of addition being sufficient to maintain the temperature at between 40–50° C. At the end of this reaction period, a solution of the ammonia epichlorohydrin polymer was withdrawn and cooled to room temperature.

To 190 parts of this polymeric solution were added 116 parts of a 10% aqueous solution of a polyethylene imine. This mixture was then transferred to a 2000 ml. three necked flask equipped with a thermometer, mechanical stirrer, water condenser and Dean and Stark water trap. The flask contained 900 ml. of toluene and 9 parts of an ethoxylated fatty acid amide which was used as a dispersant.

After vigorous agitation was applied to the reaction for fixe minutes, ten parts of epichlorohydrin was added and the temperature was raised to 85° C. whereupon an azeotropic mixture of water and toluene began to reflux.

The refluxing was continued for 4½ hours with water being removed as necessary from the Dean and Stark trap. During the course of the reaction, agitation was continued and adjusted to the speed necessary to give the desired bead particles. At the end of the heating period, the mixture was cooled and the resinous beads obtained were filtered, air dried and screened for testing through a 10–50 mesh series of screens.

EXAMPLE III

This example illustrates the preparation of resin particles from a gelled mass formed by reacting an ammonia-glycerol halohydrin and polyethylene imine. 103 parts of 28% ammonia (1.7 mols) solution were placed in a 500 ml., 3-necked flasked equipped with a mechanical stirrer and dropping funnel. 92.5 parts of epichlorohydrin (1 mol) were added dropwise to the aqueous ammonia throughout a 1½ hour period. The rate of addition was controlled so that the reaction was held at a temperature about 90° C. To this reaction mass was added 120 parts of a 10% solution of N-methyl polyethylene imine which was cooled to 20° C. This reaction mass was heated to 60° C. for 1 hour. At the end of the reaction period the mass had set up to a solid gel. The gel was then removed from the flask and was heated to a temperature of 90° C. for 8 hours. At the end of that time the finished product was a hard brittle resin which was ground into fine granules by the use of a mortar and pestle.

EXAMPLE VI 90 g. of a EPI—NH$_3$ condensation product was prepared in accordance with Example I and was mixed with 35.8 g. of a 33% solution of polydimethylaminoethylmethacrylate. A very viscous liquid was obtained. The mixture was added to 450 ml. of toluene plus 4.5 g. of suspending agent with stirring. After 5 minutes, 5 g. of epichlorohydrin was added and then heated. Water was removed azeotropically over a period of 4½ hours. The product was filtered and air dried.

After a study of the above examples, it will be obvious to those skilled in the art, that several modifications of the above preparative technique may be utilized without departing from the spirit of the invention. Azeotrope formers other than toluene such as, for instance, benzene, xylene, etc., may be employed in performing the reflux reaction operation.

Also, obvious to those skilled in the art is the fact that the beads of the ammonia-epichlorohydrin glycerol halohydrin-polyamine reaction product may be first prepared, washed, dried, and then suspended in a suitable alkylating medium where they may be further reacted with the glycerol halohydrin.

An interesting and important feature of the invention resides in the improved and surprising capacities obtained when the reaction product of the ammonia-glycerol halohydrin and polyamines are reacted with the glycerol halohydrin. It has been shown by comparative experimentation that when other conventional alkylating agents such as ethylene dichloride, dimethyl sulfate, ethyl chloride, and the like are used as substitutes for the glycerol halohydrins, the capacities of the polymers are substantially not improved and in many instances, such alkylation tends to destroy the weak base characteristics of the resin.

To illustrate some of the advantages and improved characteristics afforded by the practices and examples hereinabove given, there is presented below Table I which gives some of the operating characteristics of several of the anion exchange resins prepared in the example.

*Table 1*

| Composition | Water Holding Capacity | TC,[1] meq./g. | TC, meq./ml. | Column Test Operating Capacity, kgr./cu. ft. | SSC,[2] meq./g. | SSC, meq./ml. | Percent Expansion (From Free amine form to HCl Salt Form) |
|---|---|---|---|---|---|---|---|
| Example II | 61.0 | 10.80 | 2.53 | 33.4 | 0.33 | 0.08 | 16.6 |
| Example IV | 68.8 | 10.64 | 2.09 | 33.6 | 1.36 | 0.27 | 16.6 |
| Example V | 62.5 | 9.33 | 1.94 | 21.5 | Trace | Trace | 6.9 |
| Example VI | 61.2 | 9.15 | 2.07 | 20.1 | 0.35 | 0.08 | 11.4 |

[1] Total capacity.
[2] Salt splitting capacity.

EXAMPLE IV

To 190 parts of the aqueous ammonia-epichlorohydrin condensation polymeric solution prepared in accordance with Example I was added with agitation, 17.2 parts of N, N, N', N' tetramethyl ethylenediamine. This resultant mixture was added to a 2000 ml. flask equipped with mechanical stirrer, thermometer, water condenser and Dean and Stark water trap. To the reaction flask before the reaction began was added 900 ml. of toluene and 9 parts of a suitable emulsion-polymerization wetting agent. The beads were prepared as illustrated in Example II with the exception that the total reflux time was three hours.

EXAMPLE V

To 190 parts of the aqueous ammonia epichlorohydrin condensation polymeric solution prepared in accordance with Example II there was added 17.2 parts of N, N, N', N' tetramethyl guanidine. The beads were prepared as described in the previous example with the exception that the total reflux time was 3½ hours.

Table I shows that the resins of the invention have an expansion characteristic which is somewhat similar to those obtained from a strong base resin yet the compositions of the invention exhibit all of the characteristics of a weak base resin. It will be clear to those skilled in the art that by adjusting the amount of the polyamine used in the reaction that a resin can be obtained which exhibits neither swelling nor shrinking from the amine form to the HCl salt form. Similarly, it may be observed from the table that relatively high operating capacities are achieved. It is to be further noted from the data presented in Table I that the resins possess a slight degree of salt-splitting capacity which enables them to remove minor amounts of weak acids such as carbonic and silicic.

The resins of the invention when tested under strong oxidizing conditions tended to maintain their operating capacities even though many commercial resins tested for comparative purposes lost substantial quantities of operating capacities. Similarly, it was noted that there was less physical degeneration of the resins of the invention as compared to several samples of commercial resins.

Cost analyses based on production time requirements and production techniques have indicated that the resins of the invention are capable of being prepared with substantial savings in manufacturing costs being achieved.

A surprising feature of the invention resides in the water holding capacity of the resins which as shown in Table I are quite high. This improved water holding capacity is an indication of the porosity or absorptive capacity of the resins which means they are capable of absorbing large quantities of organic anionic materials which are commonly found in many waters. These organic substances tend to plug and foul conventional resins but not those prepared herein. This is extremely important in large scale demineralization operations where to be practical, a particular resin must be capable of withstanding the presence of large molecules of organic anionic substances without a loss of capacity ensuing. As a general rule, the water holding capacities of the resins will be within the range of 50 to 70% by weight.

This application is a continuation in part of our co-pending application Serial No. 23,914, now Patent No. 3,047,516, which was filed on April 22, 1960.

We claim:

1. A high capacity weak base anion exchange resin which comprises a water insoluble resinous condensate formed by the reaction of (A) a water soluble copolymer of ammonia and a glycerol halohydrin with (B) a water soluble condensation substantially heterocyclic free polyamine from the group consisting of water soluble secondary and tertiary polyamines, where A is the reaction product of aqueous ammonia to halohydrin in a molar ratio of 1:1 to 4:1.

2. A high capacity weak base anion exchange resin which comprises a water insoluble resinous condensate formed by the reaction of (A) a water soluble condensation copolymer of ammonia and a glycerol alpha monohalohydrin, said polymer being the reaction product of about 1 to 4 mols of ammonia per mol of glycerol alpha monohalohydrin with (B) a water soluble substantially heterocyclic free polyamine from the group consisting of water soluble secondary and tertiary polyamines with the weight ratio of A to B being within the range of from 1:99 to 30:70.

3. The high capacity weak base anion exchange resin of claim 2 where the glycerol alpha halohydrin is epichlorohydrin.

4. The high capacity weak base anion exchange resin of claim 2 where the substantially heterocyclic free polyamine is a water soluble polymer of an ethylene imine having the general structural formula

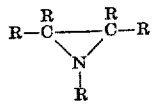

wherein R is a member of the class consisting of hydrogen and lower aliphatic groups of not more than 3 carbon atoms in chain length.

5. The high capacity weak base anion exchange resin of claim 4 where the water soluble polymer of an ethyleneimine is polyethylene imine.

6. The high capacity weak base anion exchange resin of claim 4 where the water soluble polymer of an ethylene imine is poly-N-methyl ethylene imine.

7. The high capacity weak base anion exchange resin of claim 2 where the substantially heterocyclic free polyamine is N,N,N',N' tetramethyl guanidine.

8. The high capacity weak base anion exchange resin of claim 2 where the substantially heterocyclic free polyamine is N,N,N',N' tetramethyl ethylene diamine.

9. The high capacity weak base anion exchange resin of claim 2 where the substantially heterocyclic free polyamine is poly N,-dimethyl aminomethyl methacrylate.

10. The method of treating liquids to remove anions of dissolved electrolytes which comprises contacting said liquids with particles of a high capacity weak base anion exchange resin which comprises a water insoluble resinous condensate formed by the reaction of (A) a water soluble condensation copolymer of ammonia and a glycerol halohydrin with (B) a water soluble substantially heterocyclic free polyamine from the groups consisting of water soluble secondary and tertiary polyamines, where A is the reaction product of aqueous ammonia to halohydrin in a molar ratio of 1:1 to 4:1.

11. The method of treating liquids to remove anions of dissolved electrolytes which comprises contacting said liquids with particles of a high capacity weak base anion exchange resin which comprises a water insoluble resinous condensate formed by the reaction of (A) a water soluble condensation copolymer of ammonia and a glycerol alpha monohalohydrin, said polymer being the reaction product of aqueous ammonia to halohydrin in a molar ratio of about 1 to 4 mols of ammonia per mol of glycerol alpha monohalohydrin with (B) a water soluble substantially heterocyclic free polyamine from the group consisting of water soluble secondary and tertiary polyamines with the weight ratio of A to B being within the range of from 1:99 to 30:70.

12. The method of treating liquids of claim 11 where the glycerol alpha halohydrin is epichlorohydrin.

13. A high capacity, weak base anion exchange resin which comprises a water insoluble, resinous condensate formed by the reaction of (A) a water soluble condensation copolymer of ammonia and a glycerol halohydrin with (B) a water soluble substantially heterocyclic free polyamine from the group consisting of water soluble secondary and tertiary polyamines with the reaction product of (A) and (B) being further reacted with a glycerol halohydrin, where A is the reaction product of aqueous ammonia to halohydrin in a molar ratio of 1:1 to 4:1.

14. A high capacity weak base anion exchange resin which comprises a water insoluble condensate formed by the reaction of (A) a water soluble condensation copolymer of ammonia and a glycerol alpha monohalohydrin, said polymer being the reaction product of aqueous ammonia to halohydrin in a molar ratio of about 1 to 4 mols of ammonia per mol of glycerol alpha monohalohydrin with (B) a water soluble substantially heterocyclic free polyamine from the group consisting of water soluble, secondary and tertiary polyamines with the weight ratio of (A) to (B) being within the range of from 1:99 to 30:70 with the reaction product formed by the reaction of (A) and (B) being further reacted with a glycerol alpha monohalohydrin.

15. The weakly basic water insoluble anion exchange resin of claim 14 wherein the amount of glycerol alpha monohalohydrin reacted with the reaction product formed between the reaction product of (A) and (B) is within the weight range of between 1:99 to 20:80 parts.

16. The high capacity weak base anion exchange resin of claim 14 where the glycerol alpha halohydrin is epichlorohydrin.

17. The high capacity weak base anion exchange resin of claim 14 where the substantially heterocyclic free polyamine is a water soluble polymer of an ethylene imine having the general structural formula

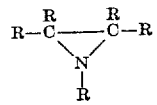

wherein R is a member of the class consisting of hydrogen and lower aliphatic groups of not more than 3 carbon atoms in chain length.

18. The high capacity weak base anion exchange resin of claim 17 where the water soluble polymer of an ethylene imine is polyethylene imine.

19. The high capacity weak base anion exchange resin of claim 17 where the water soluble polymer of an ethylene imine is poly-N-methyl ethylene imine.

20. The high capacity weak base anion exchange resin of claim 14 where the substantially heterocyclic free polyamine is N,N,N',N' tetramethyl guanidine.

21. The high capacity weak base anion exchange resin of claim 14 wheer the substantially heterocyclic free polyamine is N,N,N',N' tetramethyl ethylene diamine.

22. The high capacity weak base anion exchange resin of claim 14 where the substantially heterocyclic free polyamine is poly N-dimethyl aminomethyl methacrylate.

23. The method of treating liquids to remove anions of dissolved electrolytes therefrom which comprises contacting said liquids with particles of a high capacity weak base anion exchange resin which comprises a water insoluble, resinous condensate formed by the reaction of (A) a water soluble condensation copolymer of ammonia and a glycerol halohydrin with (B) a water soluble substantially heterocyclic free polyamine from the group consisting of water soluble secondary and tertiary polyamines with the reaction product of (A) and (B) being further reacted with a glycerol halohydrin, where A is the reaction product of aqueous ammonia to halohydrin in a molar ratio of 1:1 to 4:1.

24. The method of treating liquids to remove anions of dissolved electrolytes therefrom which comprises contacting said liquids with particles of a high capacity weak base anion exchange resin which comprises a water insoluble condensate formed by the reaction of (A) a water soluble condensation copolymer of ammonia and a glycerol alpha monohalohydrin, said polymer being the reaction product of aqueous ammonia to halohydrin in a molar ratio of about 1 to 4 mols of ammonia per mol of glycerol alpha monohydrin with (B) a water soluble secondary and tertiary polyamine with the weight ratio of (A) to (B) being within the range of from 1:99 to 30:70 with the reaction product formed by the reaction of (A) and (B) being further reacted with a glycerol alpha monohalohydrin.

25. The method of treating liquids of claim 24 where the glycerol alpha chlorohydrin is epichlorohydrin.

26. The method of preparing high capacity weak base anion exchange resin which comprises the steps of dissolving an aqueous solution of (A) a condensation copolymer of ammonia and a glycerol halohydrin, said polymer being the reaction product of aqueous ammonia to halohydrin in a molar ratio of about 1 to 4 mols of ammonia per mol of glycerol halohydrin with (B) an aqueous solution of a substantially heterocyclic free polyamine from the group consisting of water soluble secondary and tertiary polyamines, maintaining the temperature of the solutions to below 100° C. for a period of time sufficient to cause gelation to occur, drying the resultant gel produced from the reaction and forming the gel into fine particles.

27. The method of producing a high capacity weak base anion exchange resin in accordance with claim 26 wherein the water soluble copolymer of ammonia and a glycerol halohydrin contains from about 1 to 4 mols of ammonia per mol of glycerol halohydrin.

28. The process of producing a high capacity weak base anion exchange resin in accordance with claim 26 wherein the weight ratio of (A) to (B) is within the range of from 1:99 to 30:70.

29. The process for forming beads of a water insoluble weakly basic anion exchange resin which comprises the steps of suspension polymerizing in the presence of an azeotropic suspension polymerization liquid, an aqueous solution of (A) a condensation copolymer of ammonia and a glycerol halohydrin, said polymer being the reaction product of aqueous ammonia to halohydrin in a molar ratio of about 1 to 4 mols of ammonia per mol of glycerol halohydrin with (B) an aqueous solution of a substantially heterocyclic free polyamine from the group consisting of water soluble secondary and tertiary polyamines, adding to said solution during the suspension polymerization a glycerol halohydrin and continuing the suspension polymerization under temperature conditions ranging from about 85° to about 110° C. for a period of time and under conditions of agitation sufficient to form granular resinous beads, azeotropically removing water from the polymerization liquid and drying the beads so formed by the suspension polymerization.

30. The process of claim 29 where the weight ratio of (A) to (B) is within the range of from 1:99 to 30:70 and with the weight ratio of glycerol halohydrin added to the reaction product of (A) and (B) being within the range of from 1:99 to 20:80.

31. The process of claim 30 wherein the glycerol halodrin used in preparing the ammonia epihalohydrin copolymer and used in reacting with the reaction product of (A) and (B) is epichlorohydrin.

References Cited in the file of this patent

UNITED STATES PATENTS 2,104,092     Munz  ---------------- Jan. 4, 1938

UNITED STATES PATENT OFFICE
CERTIFICATE OF CORRECTION

Patent No. 3,092,617                      June 4, 1963

Charles A. Feldt et al.

It is hereby certified that error appears in the above numbered patent requiring correction and that the said Letters Patent should read as corrected below.

Column 6, line 7, for "A" read -- At --; line 30, for "It" read -- If --; column 9, line 28, after "soluble" insert -- condensation --; line 30, strike out "condensation".

Signed and sealed this 14th day of January 1964.

(SEAL)
Attest:

ERNEST W. SWIDER                      EDWIN L. REYNOLDS

Attesting Officer                      Acting Commissioner of Patents